United States Patent [19]
Buckland

[11] Patent Number: 5,410,151
[45] Date of Patent: Apr. 25, 1995

[54] FIBER OPTIC PROBE AND METHOD OF MAKING SAME

[75] Inventor: Eric L. Buckland, Raleigh, N.C.

[73] Assignee: Sumitomo Electric Lightwave Corp., Research Triangle Park, N.C.

[21] Appl. No.: 92,117

[22] Filed: Jul. 15, 1993

[51] Int. Cl.⁶ .......................... H01J 5/16; H01J 40/14
[52] U.S. Cl. ................ 250/227.26; 250/306; 250/227.11
[58] Field of Search ............. 250/227.11, 227.26, 250/306, 307

[56] References Cited

U.S. PATENT DOCUMENTS

| | | | |
|---|---|---|---|
| 4,604,520 | 8/1986 | Pohl | 250/216 |
| 4,725,727 | 2/1988 | Harder et al. | 250/227 |
| 5,105,305 | 4/1992 | Betzig et al. | 359/368 |
| 5,294,790 | 3/1994 | Ohta | 250/306 |
| 5,340,981 | 8/1994 | De Fornel | 250/227.2 |
| 5,343,460 | 8/1994 | Miyazaki | 250/306 |

FOREIGN PATENT DOCUMENTS 20487233  5/1992  European Pat. Off. ..... G02B 21/00

Primary Examiner—William L. Sikes
Assistant Examiner—Tiep H. Nguyen
Attorney, Agent, or Firm—Richard E. Jenkins

[57] ABSTRACT

A fiber optic probe is disclosed for use as a signal collector and illuminator in Near Field Scanning Microscopy (NSOM) and Photon Scanning Tunneling Microscopy (PSTM) and the like. The tip of the probe is designed to reduce local mode coupling in favor of optical scattering as the primary signal transduction mechanism in order to maximize resolution. The optical fiber used is of sufficient numerical aperture to allow efficient capture and transfer to a detector of photons scattered at the probe tip. Further, the rate of taper between the probe tip and the transmission fiber is controlled to minimize signal loss in the transition as well as to minimize signal loss when the probe is used as an illumination source.

16 Claims, 9 Drawing Sheets

FIBER OPTIC PROBE AND METHOD OF MAKING SAME

TECHNICAL FIELD

This invention relates generally to a fiber optic probe for optical imaging and particularly to an improved fiber optic probe for use as a signal collector and illuminator in Near Field Scanning Optical Microscopy (NSOM) and Photon Scanning Tunneling Microscopy (PSTM) and the like.

BACKGROUND ART

Spectroscopic and imaging studies of materials are of continuing interest for their role in helping to understand fundamental structures. For imaging and analyzing highly localized structures, however, conventional optical instruments are not suited since they operate under the classical diffraction limit. Recent advances have demonstrated the ability to perform spectroscopic analysis on single atoms or molecules confined in various electromagnetic and optical traps. The ability to image existing quantum sites in a solid could mean a significant advance in understanding of the quantum nature of materials.

Non-optical techniques, for the study of solids have long been available. Electron microscopy achieves nanometer resolution, but requires a vacuum environment and a generally conductive sample, frequently requiring the deposition of an external metallic layer onto the sample. More recent physical scanning microscopes, the scanning tunneling microscope (STM), the atomic force microscope (AFM) and the lateral force microscope (LFM) are all able to image surfaces with exceptional resolution using the control of a fine probe interacting with the surface of a sample.

Since the advent of the STM, a new class of related optical measurements has begun to emerge. These Scanning Optical Microscopy (SOM) techniques can be divided into two categories: (1) Near Field Scanning Optical Microscopy (NSOM); and (2) Photon Scanning Tunneling Microscopy (PSTM), also referred to as Evanescent Scanning Optical Microscopy (ESOM). Both approaches are intended to provide optical imaging resolution below the classical diffraction barrier and have the capability of providing imaged spectroscopy on a scale not previously realized.

The NSOM and PSTM systems are differentiated primarily in their illumination scheme. Numerous specific geometries have been evaluated. The desired resolution in NSOM is achieved through either control of illumination or collection optics. One approach utilizes scanned aperture illumination. An aperture with a radius of tens of nanometers is placed between the source and the sample and defines the structure of the near field at the sample surface. A microscope objective on the opposite side of the sample collects the transmitted light as the aperture is scanned. Alternatively, collection may be through the scanning of a fine probe in close proximity to the test sample. The scanning collection probe used to regulate resolution admits a wider range of lighting options and is used equally effectively in PSTM.

Within this class of scanning collector techniques resolution is defined by the geometry of a dielectric probe which converts energy from the field at the sample surface into propagating energy within the collector. Analytical studies of NSOM fields and some discussion of scattering mechanisms which may attribute to the tunneling between an evanescent field and a probe have been published. Preliminary experimental work has been conducted which claims that high resolution of at least $\lambda/10$ is achievable in both techniques.

However, difficulty in the previous work exists in verification of achieved resolution and the relationship between the collector probe and resolution. Efforts on probe development concentrate on developing a tip generally as small as possible, and adding a metal cladding to assist in rejection of stray light as well as providing enhanced field confinement. However, with no discussion of the impact of probe tip design on the achieved resolution, the manufacture of probes and their use in SOM remains a "black art". Additionally the prior choice of nominally single-mode transmission grade fiber as a probe has no impact on resolution and dictates a serious penalty in signal-to-noise ratio (SNR). The result is that the use of the tapered fiber optic probe as a signal collector in near field and evanescent imaging has been largely curtailed, limiting unnecessarily the options to the designer of the SOM systems.

The improved probe of the present invention provides design parameters to manufacture a tapered fiber optic collector probe with resolution below standard diffraction limits and collection efficiencies two orders of magnitude above state-of-the-art fiber optic collector probes.

DISCLOSURE OF THE INVENTION

A fiber optic probe adapted for use as a signal collector and illuminator in Near Field Scanning Optical Microscopy (NSOM), Photon Scanning Tunneling Microscopy (PSTM) and the like, said probe comprising:
(a) an optical fiber of the type characterized by a core and cladding and comprising a tip portion, a tapered portion diverging therefrom and a transmission fiber portion;
(b) said tip radius being sufficiently small to ensure single-mode operation for bare fibers or to be below cutoff of the lowest order mode for metal clad fibers; and
(c) said transmission fiber portion comprising a multimoded fiber with a $V_m > 10$ and an $NA > 0.13$, wherein:

$V_m$ = mode volume
$NA$ = numerical aperture;

whereby enhanced resolution and signal-to-noise ratio (SNR) can be achieved by said probe.

Therefore, it is an object of the present invention to provide an improved fiber optic probe for use as a signal collector and illuminator in Near Field Scanning Optical Microscopy (NSOM), Photon Scanning Tunneling Microscopy (PSTM) and the like to provide enhanced resolution and signal-to-noise ratio (SNR).

It is an object of the invention to provide an optical transducting probe providing minimum attainable resolution by being structured such that transduction is not through local mode excitations but rather through any of a broad category of incoherent excitations which scale dimensionally with the probe dimensions.

It is another object of the invention to provide a multimode, high numerical aperture optical fiber probe having the capability to effectively capture the illumination scattered at the probe tip and to transmit this signal with low loss to the detector.

It is a further object of the invention to provide an optical fiber probe wherein the transition from the probe tip to the transmitting fiber is configured so as to maximize the scattered signal transferred from the probe tip to the transmitting fiber by constructing the angle of taper to divert scattered rays into propagating modes.

Some of the objects of the invention having been stated hereinabove, other objects will become evident as the description proceeds, when taken in connection with the accompanying drawings as best described hereinbelow.

BEST MODE FOR CARRYING OUT THE INVENTION

Figure 1:
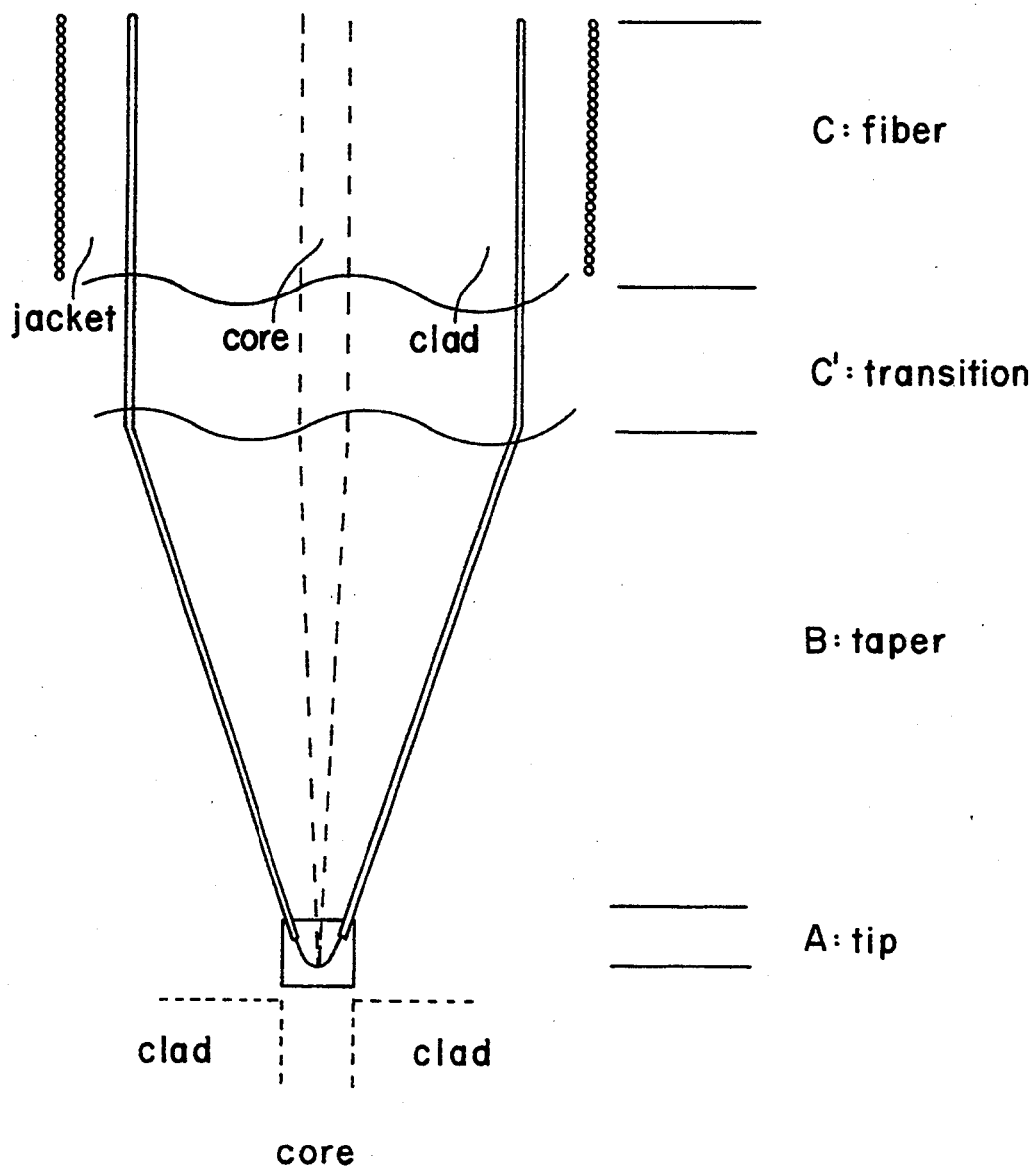
FIG. 1 is a schematic representation of the novel fiber optic probe of the invention.

The novel probe (generally designated 100) used for optical imaging is a dielectric fiber tapered to a fine point, with a diameter most suitably less than 100 nm. The imaging and signal transduction mechanisms of the probe are affected by the structure of the probe in three significant regions: the tip; the taper; and the fiber as best shown in FIG. 1.

The first region of the probe, and the region primarily responsible for the resolution, is tip 10. The source field interacts with the probe in this region. The next region is taper 20. The taper serves to effect the physical transition of the fine tip to the dimensions of transmission fiber 30. The structure and shape of taper 20 are influential in determining the fraction of power coupled into traveling wave modes of the fiber 30. Unless the length of the fiber from taper to detector (not shown) is sufficiently short so that radiation and leaky modes are not attenuated, it is the propagation modes of this region which determine the signal strength at the detector.

A fourth intermediate region 40 may be important in the probe design. This section is a transition region from taper 20 to the homogeneous and static waveguiding region of the fiber, and may be lossy due to the possibility of bends, stresses, cladding variations or other perturbations to the fiber. Therefore, the structure of the taper should be such that sufficient power is coupled to tightly bound propagation modes at the top of taper 20, minimizing subsequent coupling into and attenuation from radiation modes in region 40.

The choice of fiber for use as probe 100 is generally independent of the desired resolution, as it is the local geometry of tip 10 which controls this function. Therefore, the design of probe tip 10 must be such that signal transduction is dominated by scattering mechanisms rather than by local mode coupling mechanisms, as described below.

The local mode structure of tip 10 of probe 100 forms a complete orthogonal set, so that the total field impinging on probe tip 10 may be viewed as a sum of fields over a finite set of bounds, or propagation modes, plus an integral over an infinite set of radiation modes $$E_s = \Sigma a_i E_{Bi} + \int a_I E_{RI} di \qquad (1)$$

The fields of a dielectric wave guide have been well established. For a step index fiber with a fixed core radius and infinite cladding, the defining parameters are the source vacuum wavelength $\lambda$, the radius of the core (guiding region), $\rho$, the refractive index difference $$\Delta = (n_1^2 - n_0^2)/(2n_1^2)$$

between the core of index $n_1$ and the cladding of index $n_0$, and the normalized frequency parameter $V=2\pi(\rho/\lambda)n_1\sqrt{2\Delta}$. The boundary conditions in the cylindrical dielectric structure require continuity of the tangential components of the electric field and its first derivative.

For the typical probe to be used in SOM systems, the core of silica or doped-silica glass will have a diameter less than 100 nm. The cladding is the air or other immersion environment, and may be assumed to be essentially infinite in transverse extent. The tip will support multiple propagating modes for $V>2.405$. In all imaginable circumstances of the collection-mode SOM systems, $V<2.405$ at the tip so that signal transduction analysis must be concerned only with the behavior of the fundamental $HE_{11}$ mode. For the all-dielectric guide, the $HE_{11}$ mode has no cutoff, existing for all decreasing tip diameters or increasing wavelengths.

Figure 2:
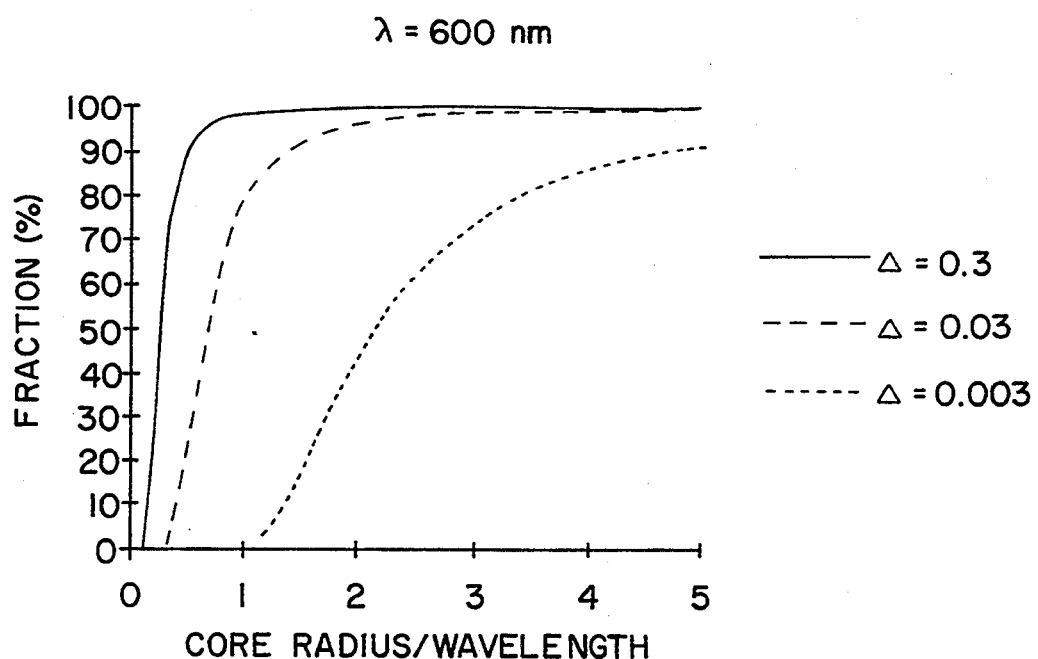
FIG. 2 is a graph of the fraction of $HE_{11}$ mode power contained within the optical fiber core plotted as a function of normalized core radius.
Figure 3:
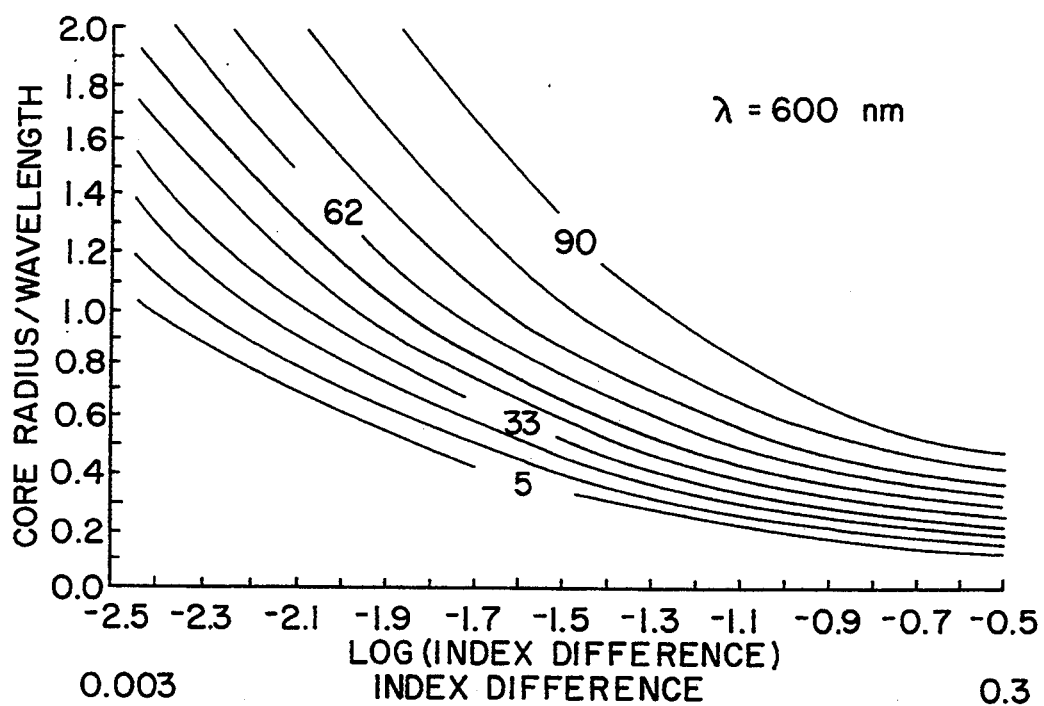
FIG. 3 is a graph of the lines of constant fractional power in the optical fiber core as a percent of the total $HE_{11}$ mode power.

For a fixed environment and wavelength, the fraction of guided power which is actually contained within the core, or within the bounds of the probe tip, decreases monotonically with normalized core radius $\rho/\lambda$. As the ambient is changed in order to affect the source-sample interaction, the refractive index difference at the tip may change. For example, a probe in water, $n_0=1.3$, will have $\Delta=0.103$. FIG. 2 shows the fractional power in the tip as a function of normalized core radius $\rho/\lambda$ for three decades of index difference. FIG. 3 gives contour lines for constant fractional core power as a function of $\Delta$ and $\rho/\lambda$. This demonstrates the effect of the ambient on the field structure and shows that below a critical radius, a large fraction of the field resides exterior to the tip. As will be shown this corresponds to an undesirable ballooning in resolution when modal coupling is the transduction mechanism.

The widths of the intensity distribution of the modal fields show a parallel divergence at small radii. Two definitions of width should be considered, the full width at half maximum (FWHM) and the second moment or root-mean-square (RMS) width. For weakly guiding fibers, the field distribution is nearly Gaussian; the RMS width gives the 1/e width of the intensity distribution. As the field deviates from Gaussian, i.e. with decreasing $\rho/\lambda$, the RMS width becomes more sensitive to the increasing radial extent of the field. The RMS width is defined as $$W_{RMS} = 2 \frac{\int\int_\infty (E \times H^*) \cdot \hat{k} \, r^3 \, dr \, d\theta}{\int\int_\infty (E \times H^*) \cdot \hat{k} \, r \, dr \, d\theta} \quad (2)$$

Figure 4A:
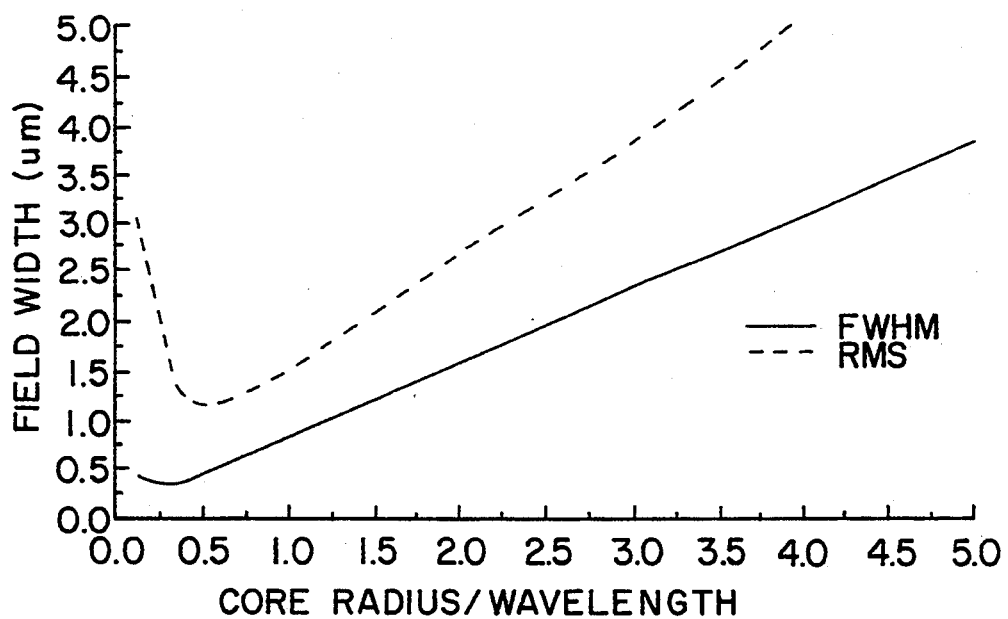
FIGS. 4A-4B are graphs of FWHM and RMS $HE_{11}$ modal field widths for $\Delta=0.3$ and $\Delta=0.003$, respectively.
Figure 4B:
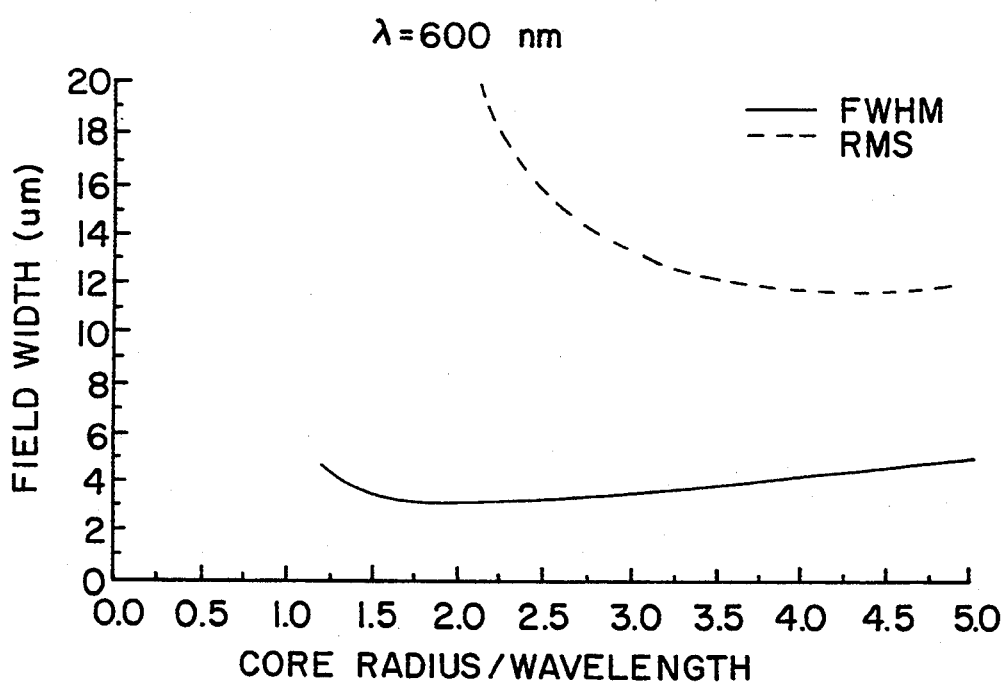

In FIG. 4 the intensity distribution widths of the fundamental field of the probe tip are plotted as a function of decreasing tip radius for (a) $\Delta=0.3$ and (b) $\Delta=0.003$. The field widths do continue to decrease as the tip radius decreases. However, the confining strength of the refractive index difference is overpowered by classical diffractive forces as $\rho/\lambda$ decreases. The field is effectively ejected from the core, and the widths increase sharply.

Modal coupling resolution limits are quantified by examining the signal transduction by the tip as a well defined source or array of sources is scanned. Let the source be a delta function defined at the plane of the probe tip, $z=0$, with polarization in the x-y plane.

$$E_s E_{xy} \delta(x-x_0, y-y_0)(\hat{i}+\hat{j}) \quad (3)$$

such that $$\int\int_\infty (E_s \cdot E_s) dA = 1$$

where the integral over the surface at $z=0$, $dA=dx \, dy$. $E_s(x,y)$ represents the total field at the probe tip, which may then be expanded in terms of the orthogonal fiber waveguide modes, as in Equation 1 hereinabove.

The first term is a sum over bound modes with amplitudes $a_i$; these are the only modes which can propagate to the detector. The second term is an integration over the continuum of radiation modes, required to form a complete description of the excitation field $E_s$. Power coupled into radiation modes will not be stable enough to propagate to a distant detector. As the tip is sufficiently small to support only the fundamental $HE_{11}$ bound mode, it is necessary only to find the amplitudes $a_{11}^{\pm}$ where the $\pm$ indicates the orthogonal sine and cosine dependent polarizations.

The power coupling amplitudes are $$a_i = \frac{\left[\int\int_\infty (E_F \times H^*_s) \cdot \hat{k} \, dA\right]^2}{N_F \int\int_\infty (E_s \times H^*_s) \cdot \hat{k} \, dA} \quad (4)$$

$N_F$ is the intensity normalization of the fiber field and is equal to $$N_F = \int\int_\infty (E_F \times H^*_F) \cdot \hat{k} \, dA \quad (5)$$

The second term in the denominator is the excitation normalization, which is equal to 1 for the delta source. Thus for the delta function $$a_i = \frac{\left[\int\int_\infty (x-x_0, y-y_0)(\hat{i}+\hat{j}) \cdot E_F \, dA\right]^2}{N_F} = \quad (6)$$

$$\frac{E_F^2(x_0, y_0)}{N_F}$$

Figure 5A:
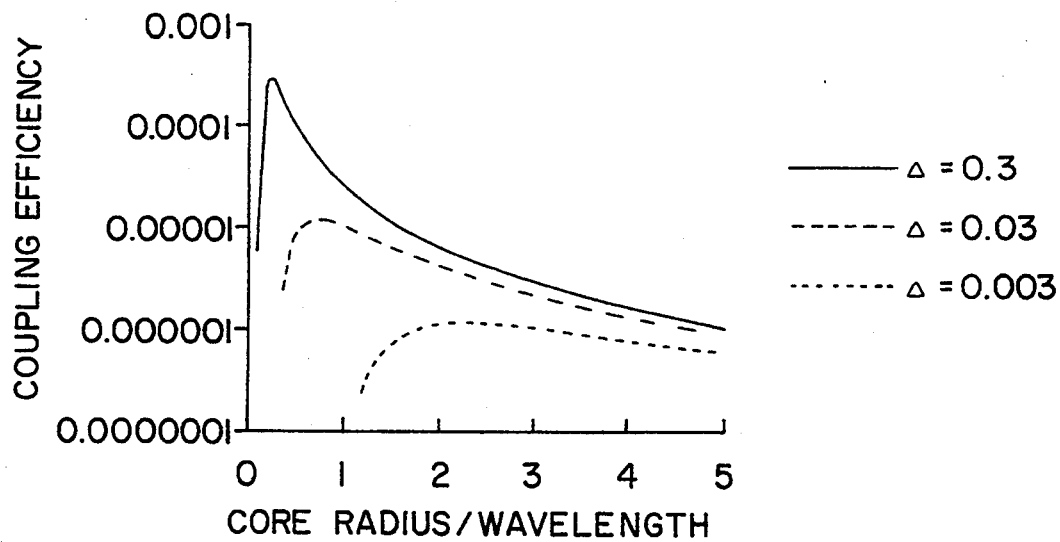
FIGS. 5A-5B are graphs of amplitudes for coupling between a delta-function source and the $HE_{11}$ mode of the fiber optic probe tip at (1) absolute efficiency and (2) efficiency normalized to the maximum values for tips having $\Delta=0.3$, $\Delta=0.03$ and $\Delta=0.003$, respectively.
Figure 5B:
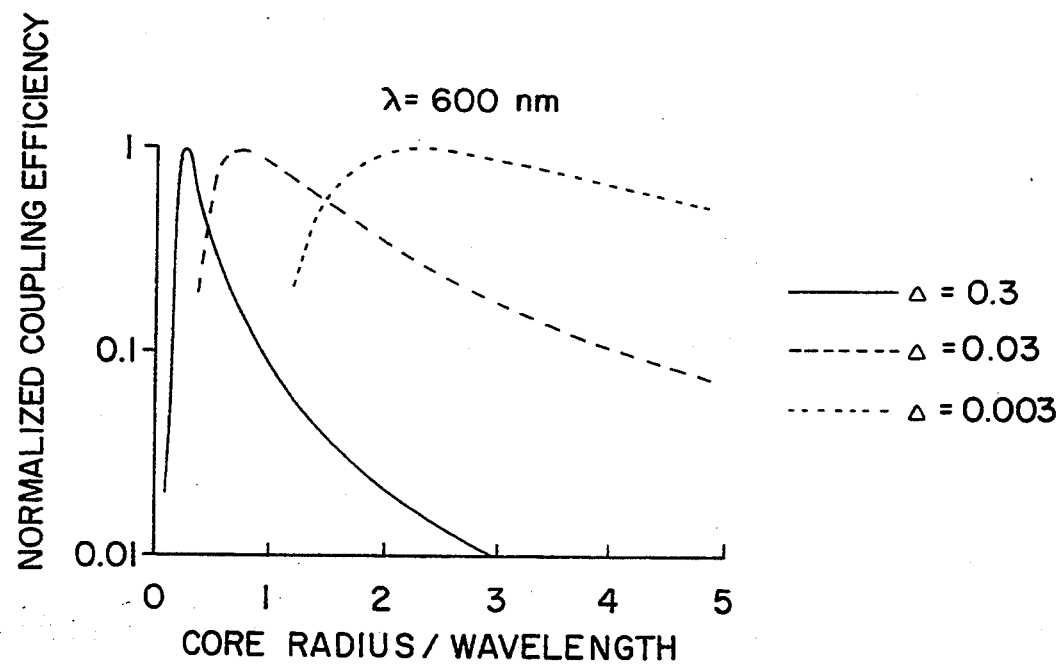

As the delta function source is scanned by the probe, an image of the field intensity distribution $E_F^2(r)$ of the fiber fundamental mode is obtained. The maximum amplitude is obtained for the source $E_s$ on axis with the tip. This amplitude varies with index difference $\Delta$ and normalized core radius $\rho/\lambda$ as shown in FIG. 5(A). Here the ordinate gives the absolute amplitude $E_F^2(0)/N_F$. In FIG. 5(B), these same data are replotted, normalized to the maximum value of $E_F^2(0)/N_F$ for each index difference. These results correlate well with the diffraction limited reduction in field width. The peak intensity of the mode decreases sharply as the fraction of power in the tip decreases, and the field width increases.

Figure 6:
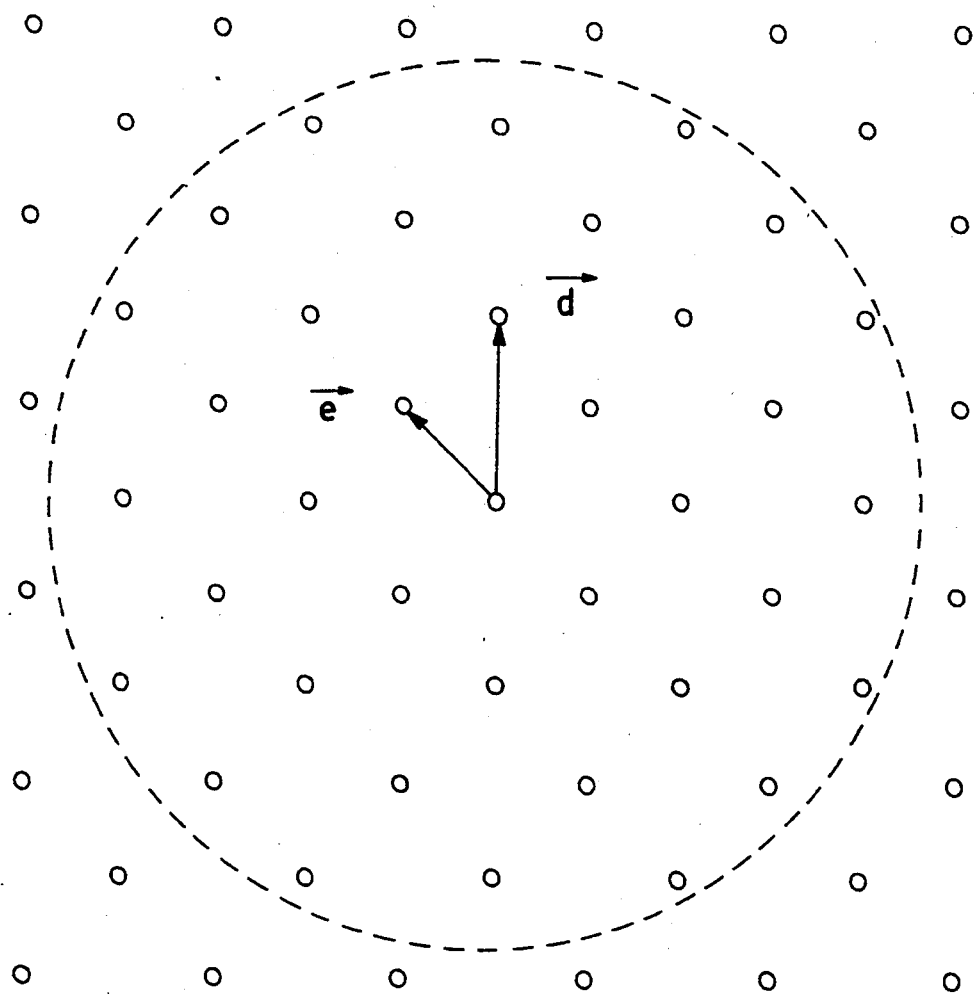
FIG. 6 is a two-dimensional square array of delta-function sources.

The resolution of an imaging system is defined by the ability to identify or discriminate between increasingly fine features. Specifically, the resolution may be defined by the signal-to-noise ratio (SNR) between maxima and minima of the intensity distribution in the scan of a closely spaced delta function array. Using the field coupling mechanisms described above, the transduced signal is calculated by summing the contributions from all points on a 2-dimensional infinite square array as seen in FIG. 6. A peak should be detected as the probe crosses directly over any array point. A minimum signal will be obtained at the midpoint of the diagonal between second nearest neighbors, a distance d/2 from any point.

Figure 7:
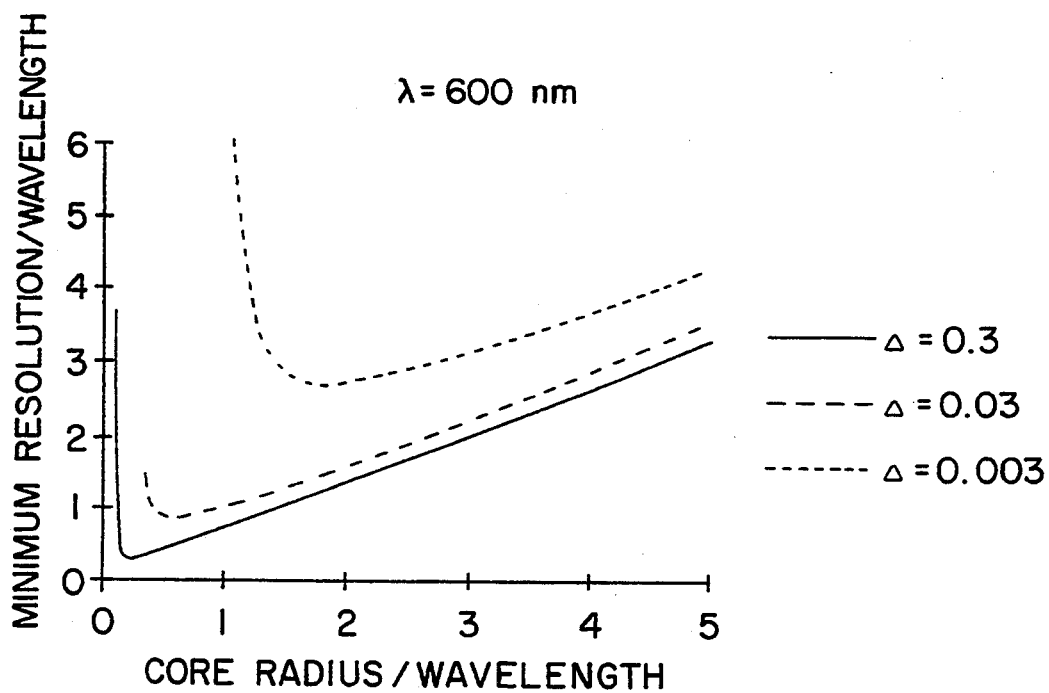
FIG. 7 is a graph showing minimum achievable resolution when coupling from a delta-function source array into the $HE_{11}$ mode as a function of normalized core radius for $\Delta=0.3$, $\Delta=0.03$ and $\Delta=0.003$.

As the nearest neighbor spacing e is reduced, the signal intensity at the midway point e/2 between nearest neighbors increases until it is equal to or greater than the intensity recorded as the probe scans directly over an array point. As this occurs and the image becomes blurred along the nearest neighbor direction, the two dimensional array takes on the image of parallel lines. This minimum spacing defines the limit of resolution. FIG. 7 shows the calculated resolution for the silica/air as the tip radius decreases. Clearly resolution is limited by the small radius fundamental mode behavior and coupling through the fundamental mode does not allow increasingly fine imaging resolution to scale with ever finer tips. The resolution minimum for the silica/air fiber has an optimum value at a normalized core radius of approximately 0.2.

One step towards improving resolution is to apply a metal cladding around the taper and the tip. Around the taper, the metal cladding serves to facilitate stray light rejection. Around the tip, the metal cladding alters the waveguide characteristics and thus the field coupling mechanism.

The lowest bound mode in a metallic cylindrical waveguide is the $TE_{11}$, with a radial dependence of the transverse field component $$E_M(r) = J_1\left(U\frac{r}{\rho}\right) \quad (7)$$

and a normalized frequency $V=2\pi(\rho/\lambda)n_1$.

Assuming perfect conductivity of the cladding, the field must be continuous at $r=\rho$, so that $U_{min}=1.841$, the first zero of $J_1'(U)$. The fractional power in the core is always 1 where the field exists, but at $\rho/\lambda=1.841/(2\pi n_1)$ the mode is cutoff. There is no bound mode solution for geometries beneath this limit. Thus the finest resolution for the metal-clad fiber occurs at cutoff, $\rho/\lambda=0.2$. In terms of direct coupling to bound modes, minimal benefit is realized through the application of the metal cladding. However, the distinct cutoff of bound modes is very advantageous in reducing competition between these coupling mechanisms and secondary coupling through scattering.

The direct coupling into local bound modes of the probe represents the excitations of coherent oscillations of the molecular structure of the probe tip. The assumption is made that these collective oscillations propagate coherently as the taper broadens, an assumption clearly acceptable in this discussion of resolution, but which may not be reasonable in a discussion of the signal received at the detector. In addition to these excitations there are independent excitations or scattering events which can lead to secondary coupling. Scattering occurs due to edge effects or inhomogeneities, with some fraction of the radiated light coupling into propagation modes in the scattering far field.

In order to determine the power coupled through the scattering of a source field into detectable homogeneous modes, one must determine first the fraction of incident power scattered, and then the fraction of scattered power which subsequently couples into waveguide bound modes. The detected signal $I_D$ is $$I_D = I_0 S \alpha_s \quad (8)$$

where now S is the scattering captured fraction, $I_0$ is the total optical intensity impinging on the probe tip, $\alpha_s$ is the scattering coefficient. Signal transduction in the case of bound-mode coupling previously analyzed occurs even for sources located a distance from the physical probe tip. An analysis of scattering transduction must also consider the influence of remote sources. Thus $$I_D = \int\int\int_V I_0(x,y,z)S(x,y)\alpha_s(x,y)dA\,dz = \quad (9)$$

-continued $$\int\int\int_V [(I_0 S \alpha_s)^A + (I_0 S \alpha_s)^E + (I_0 S \alpha_s)^T]dA\,dz$$

where the superscripts A, E and T refer to events in the ambient (not in the immediate vicinity of the tip), on the tip edge, and across the face of the tip, respectively. For the delta function source considered, $I_0=1$.

The scattering coefficient in the ambient, as well as the capture fraction for events occurring external to the tip are negligible. Edge events will increase in importance as the circumference to area ratio increases, but the specific analysis of these events does not alter the basic principle. Thus the detectable power obtained through the secondary collection of light scattered at the probe tip is $$I_D = S\alpha_s \int_a dz \int_T I_0(x,y,z)dA \quad (10)$$

Because the scattering coefficient is dependent on the penetration depth, it is necessary to make assumptions on this value. Approximating a constant field over volume $V=\rho^3$, dropping to zero outside $\rho$:

$$\begin{aligned}I_D &= S\alpha_s \int_0^\rho dz \int_T \delta(x-x_0, y-y_0)dA \\ &= S\alpha_s\rho\end{aligned} \quad (11)$$

With the scattering transduction mechanism, resolution is equal to the tip diameter for the delta source model. Resolution can thus improve as long as the tip size can be reduced. As the total signal is the sum of local modal excitations plus these scattering excitations captured in the far field, resolution scaling with increasingly fine tip dimension is possible as long as the signal strength transduced through scattering is significantly greater than the signal strength transduced through modal field coupling.

For the class of silica-based fibers Rayleigh scattering, caused by local fluctuations in the permittivity, provides a minimum level of scattering. The scatter coefficient may be increased by doping or otherwise increasing the inhomogeneity of the tip. In any case, a numerical calculation of transduced intensity of Rayleigh scattered light is given.

The Rayleigh scattering in various grades of telecommunications grade fibers has been studied. The resultant dipole scattering per unit volume has a characteristic $\cos^2(\theta)$ angular dependence and $\lambda^{-4}$ wavelength dependence. For pure silica fibers, the scattering coefficient is 0.7 dB/km at a wavelength of 1 $\mu$m. Therefore $\alpha_R=1.175\times 10-12$ nm$^{-1}\times(1/\lambda^4)$, where $\lambda$ is in $\mu$m.

In a ray optics analysis, the capture fraction S is a function of the refractive index of the fiber, or the internal critical angle $\theta_c=\text{Sin}^{-1}\sqrt{2\Delta}$ or alternately the numerical aperture $NA=n_1 \sin\theta_c$. A generalized angular intensity distribution for Rayleigh scattering is $$I_s(\theta) \propto I_0[1+(R\cdot k)^2] \quad (12)$$

with R a unit scattering direction vector and k the unit incident wave direction vector. The fraction of scattered power within the solid angle defined by the maximum acceptance cone of the receiving fiber is then $$S = \frac{\int_0^{2\pi} \int_0^{\theta_c} [1 + (R \cdot k)^2] \sin\theta \, d\theta \, d\phi}{\int_0^{2\pi} \int_0^{\pi/2} [1 + (R \cdot k)^2] \sin\theta \, d\theta \, d\phi} \qquad (13)$$

The angle $\phi$ is the x-y plane polar angle and the angle $\theta$ is with respect to the propagation axis $\hat{kk}$.

Figure 8:
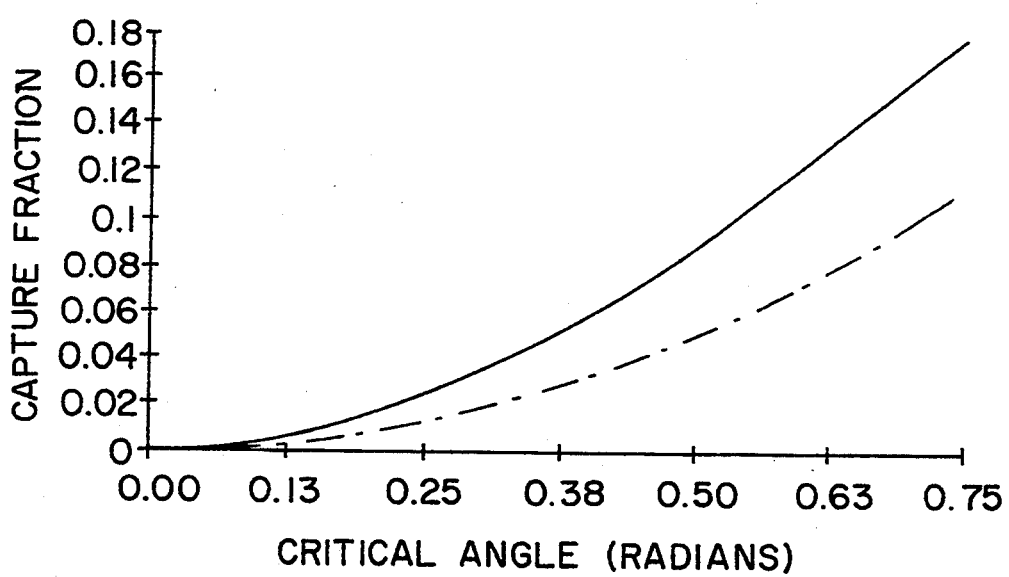
FIG. 8 is a graph showing scattering capture fraction as a function of the transmitting fiber critical angle $\theta_c$ for near field and evanescent sources.

The limiting cases are for the propagating incident wave in the near field illumination system $k_j = I_0 \hat{k}$ and for the evanescent incident wave $\text{Re}(k_j) = I_0(\hat{i} + \hat{j})$. FIG. 8 plots S for both cases as a function of $\theta_c = \sin^{-1}\sqrt{2\Delta}$. The capture fraction, and thus coupling efficiency differ by less than a factor of two, though there is a clear dependence of coupling efficiency on the critical angle of the fiber.

Figure 9:
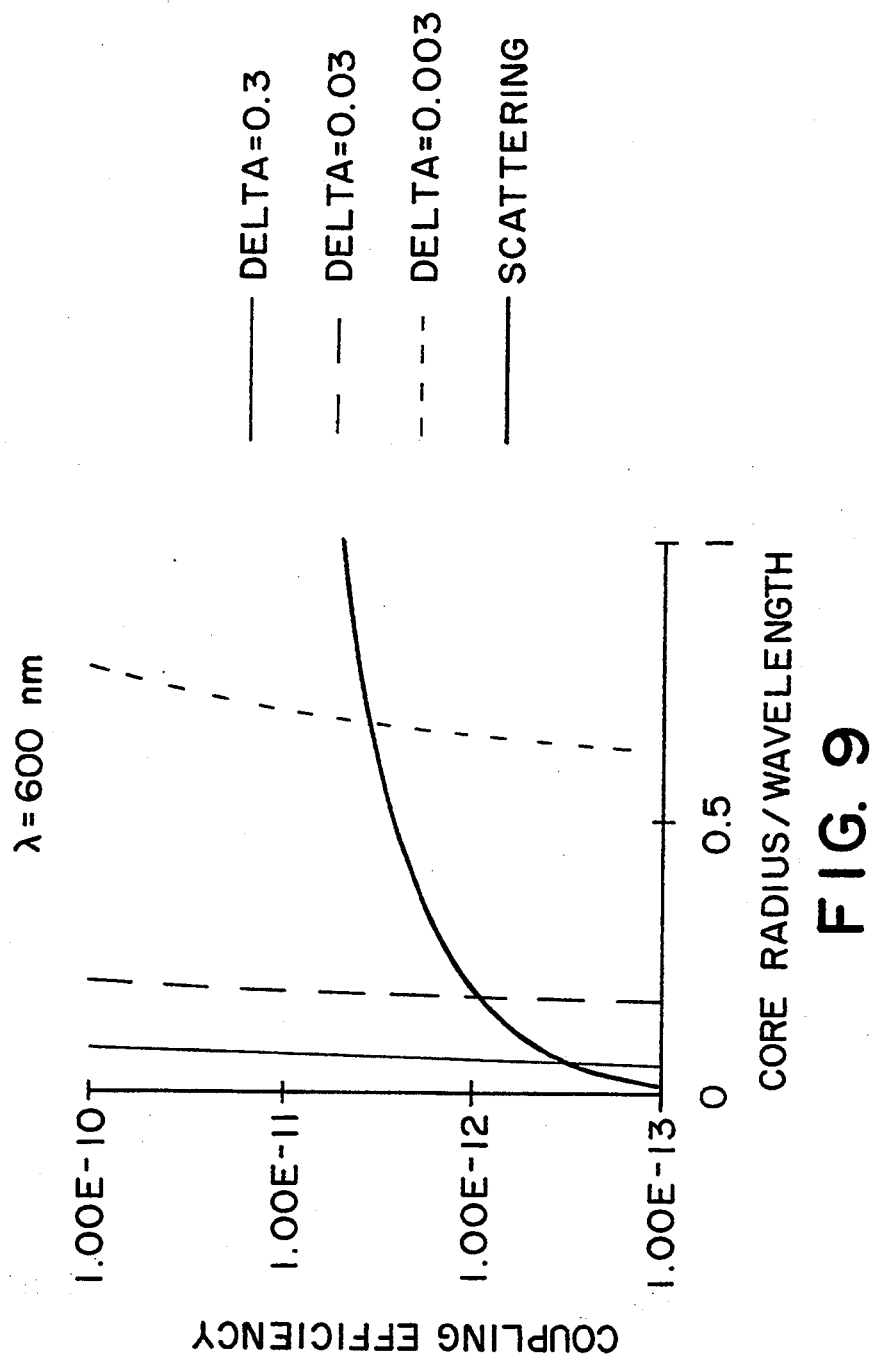
FIG. 9 is a graph showing a comparison of signal transduction efficiencies for $HE_{11}$ bound mode coupling into dielectric waveguides having three different refractive indexes and for scattering.

For $\lambda = 600$ nm, the signal intensity of the coupled mode and scattering signals is plotted in FIG. 9. The coupled mode signal is based on a silica tip in an ambient to yield an effective guiding index difference of $\Delta = 0.3$, $\Delta = 0.03$ and $\Delta = 0.003$. The scattered signal strength is based on Rayleigh scattering from the same tip, assuming unity capture of the scattered light. As the tip continues to be decreased in size, the scattering events eventually dominate the detected signal. Resolution becomes a monotonically decreasing function with tip. The crossover point is at a tip radius of approximately 30 nm at $\lambda = 600$ nm. Unity capture efficiency ($S = 1$) is not achievable with single-mode fibers currently used in scanning probe systems. For the single-mode fiber probes used widely in current test systems, with $\Delta = 0.0034$ and $\theta_c = 0.0825$, NA $= 0.12$, the relative capture efficiencies are $2.86 \times 10^{-3}$ and $1.44 \times 10^{-3}$ for NSOM and PSTM illuminations, respectively. Utilizing instead a high numerical aperture fiber, such as a silica fiber core with an air cladding, $\Delta = 0.265$ and $\theta_c = 0.728$, NA $= 0.97$, the relative capture efficiencies of the scattered signal are $1.66 \times 10^{-1}$ and $1.04 \times 10^{-1}$ for NSOM and PSTM illuminations, respectively. The use of a single-mode collector, offering nothing in terms of resolution, results in a 20 dB penalty at the detector.

Thus to achieve a probe with superior resolution capability as compared to the current art, it is necessary first to design the tip so that the lowest order propagating mode at the tip is cut off, either theoretically cut off as for a metal clad probe with $\rho/\lambda < 0.2$, or effectively as for bare silica probes with $\rho/\lambda < 0.05$, whereby it is ensured that signal transduction is dominated by scattering-type mechanisms. Second, the transmission fiber from which the probe tip is tapered should have a high numerical aperture (NA) for efficient signal collection. In terms of readily measured parameters, the NA should be greater than the NA $= 0.12$ of currently used single-mode type fibers described, and may typically be in the range $0.25 < \text{NA} < 0.35$ for available multimode type fibers, up to a maximum of NA $= 1.06$ of a silica rod in air or vacuum cladding. A related parameter, mode volume $V_m$, is specifiable. Single-mode type fibers as currently used typically have mode volumes of about 10 in the visible wavelengths often used in this microscopy. Thus any fiber with $V_m > 10$ will provide superior signal capture. Multimode fibers of the type mentioned generally have $100 < V_m < 200$.

The structure of the taper plays an additional role in the signal strength at the detector. The shape of the taper influences the transition of the field structure at the tip to the homogeneous guiding structure of the fiber. It is preferable to design the taper for a gradual transition in order for scattered light coupled into lower order modes to have a greater probability of transmitting without loss through the guiding system. Similarly, if the probe is used for illumination as well as detection, a gradual taper allows light to be transmitted from the fiber to the tip with lower loss. Of course, consideration must be given to the mechanical disadvantages of a too gently tapered probe. Such a probe may be susceptible to breaks or undesirable vibrations.

Figure 10:
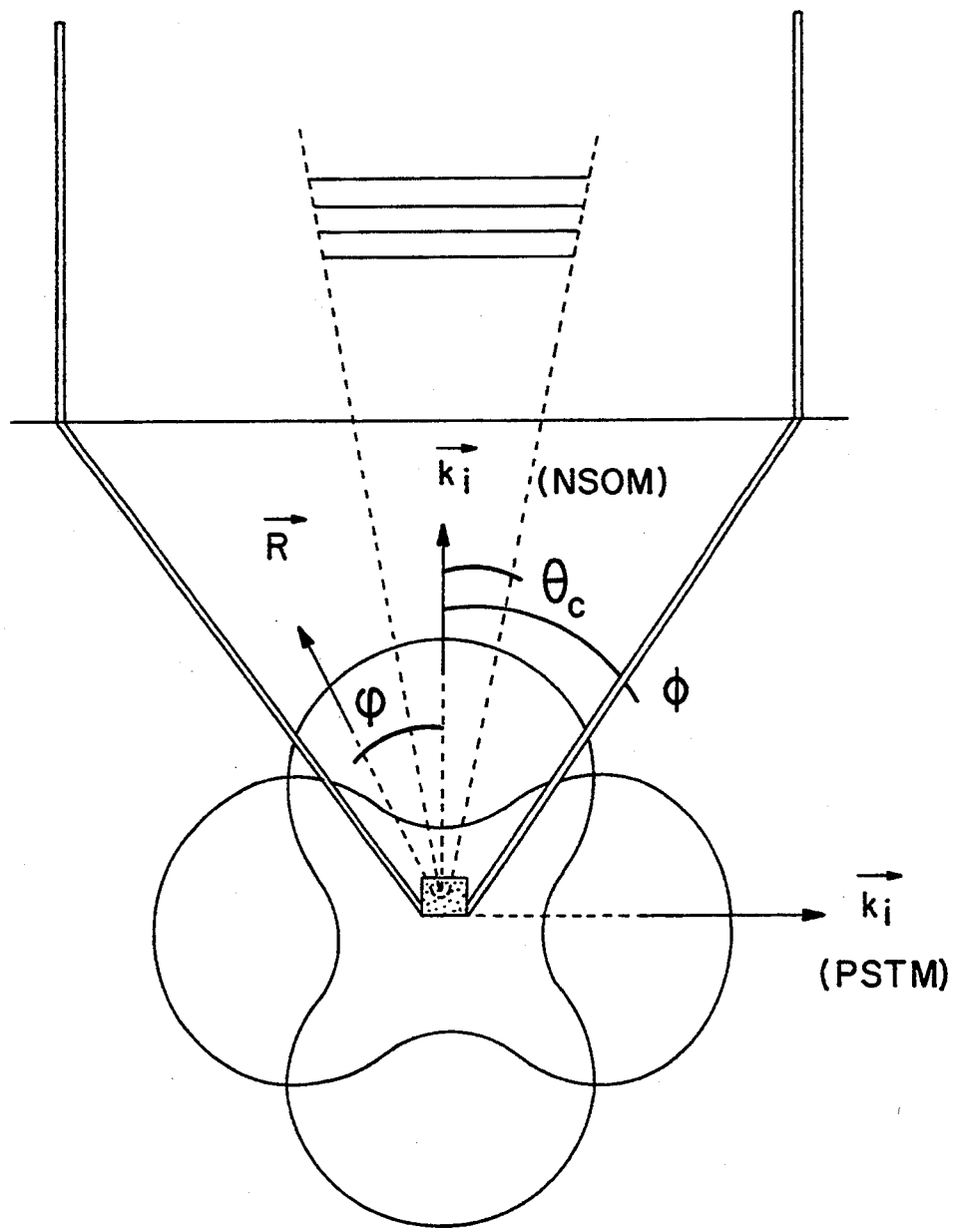
FIG. 10 is a schematic drawing of a fiber optic tip showing scattering geometry wherein the lobes are intensity distributions for Rayleigh scattering from incident evanescent (PSTM) and near-field (NSOM) waves.

An additional consideration on the degree of taper is the behavior of scattered rays within the taper. FIG. 10 shows the geometry of a scattered ray traversing a tapered structure. Consider the taper to be metal clad or otherwise having perfect reflectivity the direction of the scattered ray is transformed upon reflection by $$\theta = 2\phi - \Phi \qquad (14)$$

for angles $\Phi \geq \phi$, with angles defined in FIG. 10.

Figure 11:
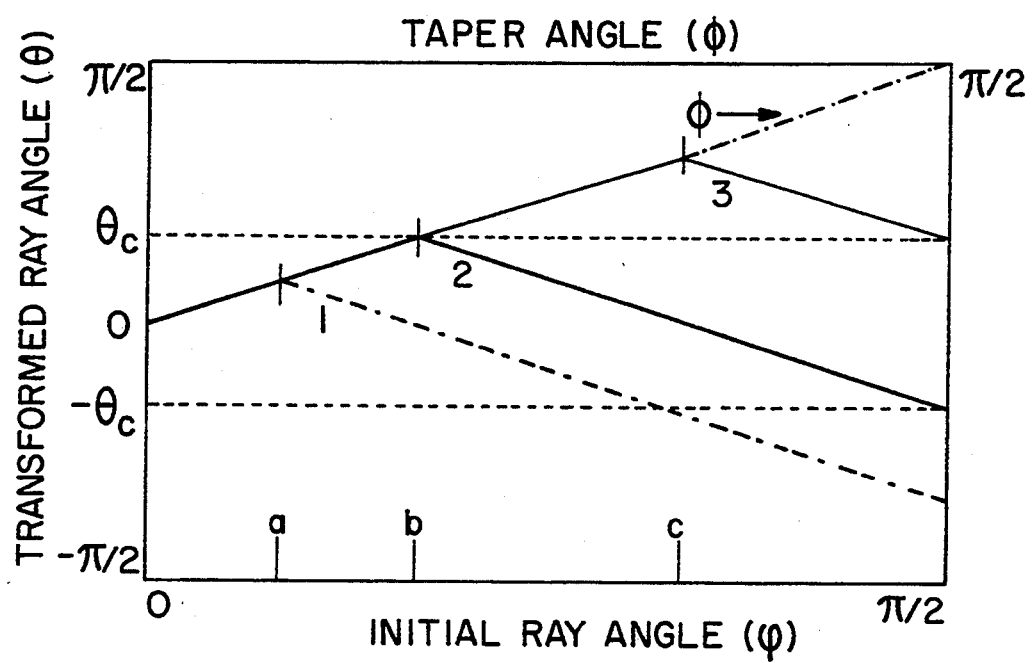
FIG. 11 is a ray transformation diagram.

The optimum taper angle is the angle which transforms the greatest ray volume to directions within the fiber numerical aperture. Graphically shown in FIG. 11, the optimum taper angle is the fiber critical angle, or approximately 45° for the silica/air fiber. In this figure, Line 1 represents the transformation of rays in a structure tapered at an angle more shallow than the fiber critical angle. The initial scattered ray is not reflected from angles 0 to a, where a is the taper angle. All other rays are transformed upon reflection as in Equation 18. From this it is apparent that scattered rays having initial trajectories from 0 to c will ultimately be within the fiber critical angle $\theta_c$. Similarly, for the taper defined by Line 3, with an angle greater than the fiber critical angle $\theta_c$, only initial trajectories from 0 to b, where b is the critical angle $\theta_c$, will be captured by the fiber. Line 2 is for a taper angle equivalent to $\theta_c$. While this schematic suggests that the entire ray volume is transformed to rays within the acceptance cone of the fiber, this will not in general be true.

The optimum taper angle $\theta t$ is the angle equal to the critical angle $\theta_c$ of the transmission fiber. For fibers with $\theta_c > \pi/6$ the optimum taper angle ranges from $(\pi/2 - \theta_c)/2 \leq \theta t \leq \theta_c$. The optimum critical angle of the fiber must be $\theta_c \geq \pi/6$ to ensure the unity collection of scattered rays. This is achievable for fibers with silica core and a cladding index less than about 1.26.

Given then the material and taper production constraints, it is an object of this invention to balance the taper angle, shallow enough for low loss delivery from fiber to tip, but wide enough to allow collection of light at the tip from the sample. This may be quantified by specifying a taper for a dual purpose probe to be angled at $\theta t \leq \theta_c$ if $\theta_c < \pi/6$, or $\theta t \leq (\pi/2 - \theta_c)/2$ if $\theta_c \geq \pi/6$.

In summary, a preferred method for the invention is to use a silica-based optical fiber, drawn or chemically etched to a fine tip. The probe may be bare glass, with a tip radius $\rho \leq 3.2\lambda$ to ensure excitation of only the lowest order mode, but preferably with a tip radius $\rho \leq 0.05\lambda$ to ensure that scattering mechanisms dominate signal transduction. The probe may alternately be metal clad with a tip radius $\rho \leq 0.2\lambda$, below cutoff of the lowest order mode. The fiber itself should be multi-moded, with a mode volume of $v_m > 10$ and numerical aperture NA $> 0.13$, corresponding to an internal critical angle $\theta_c > 4.8°$ ($\pi/38$ radians).

As practical examples, the transmission fiber may be standard data communications grade 50/125, 62.5/125 or 100/140 fibers (core diameter/cladding diameter, in microns). Then $100 < V_m < 200$; $0.25 < NA < 0.35$; $14° < \theta_c < 20°$. Other options include the use of PCF (plastic clad fiber) of pure silica surrounded by a plastic jacket of lower refractive index (preferably less than 1.26); the jacket removed from the taper and tip of the probe. Still another option is the use of an unclad glass rod, preferred if losses due to leaky modes in the region between the end of the taper and the transmission to the detector can be minimized.

It will be understood that various details of the invention may be changed without departing from the scope of the invention. Furthermore, the foregoing description is for the purpose of illustration only, and not for the purpose of limitation—the invention being defined by the claims.

What is claimed is:

1. A fiber optic probe adapted for use as a signal collector and illuminator in Near Field Scanning Optical Microscopy (NSOM), Photon Scanning Tunneling Microscopy (PSTM), said probe comprising:
   (a) an optical fiber of a type characterized by a core and cladding and comprising a tip portion, a tapered portion diverging therefrom and a transmission fiber portion;
   (b) said tip portion having a radius being sufficiently small to ensure single-mode operation for bare glass fibers or to be below cutoff of a lowest order mode for metal clad fibers; and
   (c) said transmission fiber portion comprising a multi-moded fiber with a $V_m > 10$ and an $NA > 0.13$, wherein:
   $V_m$ = mode volume
   NA = numerical aperture;
   whereby enhanced resolution and signal-to-noise ratio (SNR) can be achieved by said probe.

2. A fiber optic probe according to claim 1 wherein said tip radius is defined by equations $\rho \leq \lambda/20$ and $\rho \leq \lambda/5$ for bare glass and metal clad fibers, respectively, wherein:
   $\rho$ = optical fiber core radius
   $\lambda$ = source vacuum wavelength.

3. A fiber optic probe according to claim 1 wherein said tapered portion has an optimum taper angle defined by equation $$\theta_t \leq \theta_c \quad \text{if} \quad \theta_c \leq \frac{\pi}{6}$$

and by equation $$\theta_t \leq \left( \frac{\pi/2 - \theta_c}{2} \right) \text{if} \quad \theta_c \geq \frac{\pi}{6}, \text{ wherein:}$$

wherein:
$\theta_t$ = optimum fiber taper angle
$\theta_c$ = optimum fiber critical angle.

4. A fiber optic probe according to claim 1 wherein said optical fiber core comprises silica or doped-silica glass.

5. A fiber optic probe according to claim 4 wherein a core of the transmission fiber portion of said probe comprises a diameter of less than or equal to 100 microns.

6. A fiber optic probe according to claim 1 wherein a metal cladding is provided around at least a portion of the tapered portion and the tip portion of said optical fiber.

7. A fiber optic probe adapted for use as a signal collector and illuminator in Near Field Scanning Optical Microscopy (NSOM), Photon Scanning Tunneling Microscopy (PSTM), said probe comprising:
   (a) an optical fiber of a type characterized by a silica or doped-silica glass core and a cladding therearound and comprising a tip portion, a tapered portion diverging therefrom and a transmission fiber portion;
   (b) said tip portion having a radius being sufficiently small to ensure single-mode operation for bare glass fibers or to be below cutoff of a lowest order mode for metal clad fibers;
   (c) said transmission fiber portion comprising a multi-moded fiber with a $V_m > 10$ and an $NA > 0.13$, wherein:
   $V_m$ = mode volume
   NA = numerical aperture; and
   (d) said tapered portion defining an optimum taper angle defined by an equation $$\theta_t \leq \theta_c \quad \text{if} \quad \theta_c \leq \frac{\pi}{6}$$

and by an equation $$\theta_t \leq \left( \frac{\pi/2 - \theta_c}{2} \right) \text{if} \quad \theta_c \geq \frac{\pi}{6},$$

wherein:
$\theta_t$ = optimum fiber taper angle
$\theta_c$ = optimum fiber critical angle;
whereby enhanced resolution and signal-to-noise ratio (SNR) can be achieved by said probe.

8. A fiber optic probe according to claim 1 wherein said tip radius is defined by equations $\rho \leq \lambda/20$ and $\rho \leq \lambda/5$ for bare glass and metal clad fibers, respectively, wherein:
   $\rho$ = optical fiber core radius
   $\lambda$ = source vacuum wavelength.

9. A fiber optic probe according to claim 7 wherein a core of the transmission fiber portion of said probe comprises a diameter of less than or equal to 100 microns.

10. A fiber optic probe according to claim 7 wherein a metal cladding is provided around at least the tapered portion and the tip portion of said optical fiber.

11. A method of making a fiber optic probe adapted for use as a signal collector and illuminator in Near Field scanning Optical Microscopy (NSOM), Photon Scanning Tunneling Microscopy (PSTM), said method comprising the steps of:
   (a) providing an optical fiber of a type characterized by a core and cladding and comprising a tip portion, a tapered portion diverging therefrom and a transmission fiber portion;
   (b) defining said tip portion having a radius size so as to be sufficiently small to ensure single-mode operation for bare glass fibers or to be below cutoff of a lowest order mode for metal clad fibers; and
   (c) defining said transmission fiber portion to have a multimoded fiber with a $V_m > 10$ and an $NA > 0.13$, wherein:
   $V_m$ = mode volume NA = numerical aperture;

whereby an enhanced resolution and signal-to-noise ration (SNR) probe is achieved.

12. A method of making a fiber optic probe according to claim 11 further comprising the step of defining said tip radius by the equations $\rho \leq \lambda/20$ and $\rho \leq \lambda/5$ for bare glass fiber and metal clad fiber, respectively, wherein:

$\rho$ = optical fiber core radius
$\lambda$ = source vacuum wavelength.

13. A method of making a fiber optic probe according to claim 11 wherein said tapered portion defines an optimum taper angle defined by an equation $$\theta_t \leq \theta_c \quad \text{if} \quad \theta_c \leq \frac{\pi}{6}$$

and by an equation $$\theta_t \leq \left(\frac{\pi/2 - \theta_c}{2}\right) \text{if} \quad \theta_c \geq \frac{\pi}{6},$$

wherein:

$\theta_t$ = optimum fiber taper angle
$\theta_c$ = optimum fiber critical angle.

14. A method of making a fiber optic probe according to claim 13 wherein said optical fiber core comprises silica or doped-silica glass.

15. A method of making a fiber optic probe according to claim 14 wherein a core of the transmission fiber portion of said probe comprises a diameter of less than or equal to 100 microns.

16. A method of making a fiber optic probe according to claim 13 wherein a metal cladding is provided around at least a portion of the tapered portion and the tip portion of said optical fiber.

* * * * *